US008859079B2

United States Patent
Siebers et al.

(10) Patent No.: US 8,859,079 B2
(45) Date of Patent: Oct. 14, 2014

(54) GLASS HAVING EXCELLENT RESISTANCE AGAINST SURFACE DAMAGES AND METHOD FOR THE PRODUCTION THEREOF

(75) Inventors: Friedrich Siebers, Nierstein (DE); Bernd Ruedinger, Woerrstadt (DE); Andreas Langsdorf, Ingelheim (DE); Markus Heiss, Bishchofsheim (DE)

(73) Assignee: Schott AG, Mainz (DE)

( * ) Notice: Subject to any disclaimer, the term of this patent is extended or adjusted under 35 U.S.C. 154(b) by 493 days.

(21) Appl. No.: 13/179,047

(22) Filed: Jul. 8, 2011

(65) Prior Publication Data
US 2012/0009386 A1 Jan. 12, 2012

(30) Foreign Application Priority Data

Jul. 8, 2010 (DE) .......................... 10 2010 031 114

(51) Int. Cl.
*B32B 3/00* (2006.01)
*C03C 3/097* (2006.01)
*C03B 18/14* (2006.01)

(52) U.S. Cl.
CPC ................. *C03B 18/14* (2013.01); *C03C 3/097* (2013.01)
USPC ................. 428/143; 428/141; 501/55; 501/69

(58) Field of Classification Search
USPC ..................... 428/195.1, 141, 143; 501/55, 69
See application file for complete search history.

(56) References Cited

U.S. PATENT DOCUMENTS

| 6,060,168 | A * | 5/2000 | Kohli ............................ 428/428 |
| 6,583,077 | B1 * | 6/2003 | Nagata et al. ..................... 501/9 |
| 2005/0096208 | A1 * | 5/2005 | Zachau et al. .................... 501/9 |
| 2007/0190338 | A1 | 8/2007 | Aitken et al. |

FOREIGN PATENT DOCUMENTS

| DE | 1596514 | 3/1971 |
| DE | 10346197 | 4/2005 |

OTHER PUBLICATIONS

Examination Report dated Mar. 11, 2011 for corresponding German Patent Application No. 10 2010 031 114.6-45.

* cited by examiner

*Primary Examiner* — Bruce H Hess
*Assistant Examiner* — Christopher Polley
(74) *Attorney, Agent, or Firm* — Ohlandt, Greeley, Ruggiero & Perle, LLP

(57) ABSTRACT

A glass having excellent resistance against surface damages is provided. The glass includes a content of alkaline earth oxides of at least 0.3% by weight and of $P_2O_5$ of 0.1 to 4% by weight; the glass has at least one surface that has precipitations with a mean size of 1 to 20 μm. A method is further provided and includes melting a glass batch, yielding a glass melt, and casting the glass melt onto a float bath. The glass melt is maintained on the float bath at a temperature of above 1000° C. for at least 5 minutes, and yields glass. The glass has a content of alkaline earth oxides of at least 0.3% by weight and of P2O5 of 0.1 to 4% by weight, and the glass has at least one surface that has precipitations with a mean size of 1 to 20 μm.

6 Claims, 1 Drawing Sheet

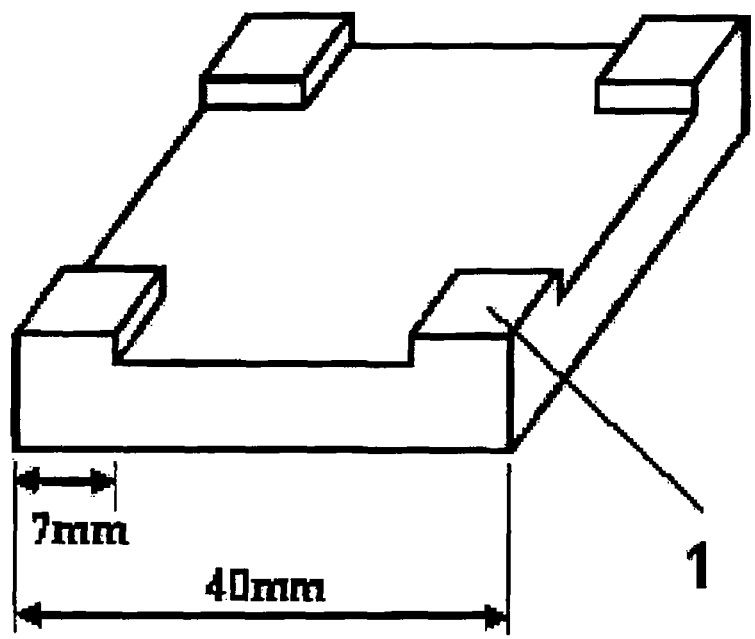

GLASS HAVING EXCELLENT RESISTANCE AGAINST SURFACE DAMAGES AND METHOD FOR THE PRODUCTION THEREOF

CROSS-REFERENCE TO RELATED APPLICATIONS

This application claims benefit under 35 U.S.C. §119(a) to German patent application No. DE 10 2010 031 114.6 filed Jul. 8, 2010, the entire contents of which are incorporated herein by reference.

BACKGROUND OF THE DISCLOSURE

1. Field of the Disclosure

The present invention relates to a glass having excellent resistance against surface damages as well as a method for the production thereof.

2. Description of Related Art

For the production of flat glass, the floating method is normally used due to its economic efficiency and the high quality of the surfaces of the flat glasses produced. In the production of flat glasses according to the floating method, the shaping is conducted by casting onto a liquid metal, normally tin, in a reducing atmosphere of forming gas. Floating facilities normally consist of a melting tank in which the glass is molten and refined, a transfer line which guarantees the transfer of the glass melt from the oxidizing atmosphere of the melting tank to the reducing atmosphere of the subsequent floating section, and the real floating section. In this floating section the shaping of the glass takes place. The shaping is effected by flat-flowing on the tin bath and by so called top rollers which exert force to the surface of the glass. During the transport on the tin bath, the glass cools down and at the end of the floating section it is lifted off and transferred into an annealing leer for thermal stress relief.

Starting with this transfer from the floating section into the annealing leer, the surface of the floating glass, in particular the floating lower contact side is subject to mechanical stress. Particularly, the first lift-out rollers after the lift-off operation are critical. In this zone the surface of the glass is particularly sensitive for mechanical stress by contact with the lift-out rollers due to the high temperatures which are near the transformation temperature $T_g$ of the glass. Thereby, point scratches may be formed. Through the higher adhesive tendency of the hot surface of the glass at the contact areas, chips and/or digs may be formed. Besides the visual impairment, the surface damages also result in lowering of strength and in disadvantages in further processing steps, for example in a coating process.

Prior art provides a preventive measure which is particularly suitable for alkali-containing glasses. Thereby, sulfur trioxide gassing is conducted. Such a treatment of the lower side with sulfur trioxide vapors in the annealing leer is described in DE 1 596 514 C3. During the gassing procedure with sulfur trioxide, sodium oxide and sulfur dioxide form sodium sulfate. Subsequently, sodium sulfate can be removed from the glass by washing. During the sulfur trioxide gassing procedure, alkali sulfate containing precipitations on the surface of glass are formed through a reaction of alkali constituents of the floated glass. These salts provide a particular protection against mechanical stress during the lift-off operation and at the subsequent lift-out rollers through their low hardness. This sulfur trioxide gassing procedure has disadvantages due to different reasons. For an effective gassing procedure with sulfur trioxide, an oxidizing atmosphere is necessary. Due to this reason, often the glass is only subject of the gassing procedure with sulfur trioxide at the point of the transfer into the annealing leer. The zone of the lift-out rollers which is still often under reducing atmosphere remains unprotected. The protection mechanism has lower efficacy in the case of alkali free or low-alkali glasses, such as e.g. display glasses. Also particular preventive measures by technical installations have to be taken to limit the content of sulfur trioxide in the environment. These protective measures are technically intricate and during the post processing purification from adherent salts is usually necessary as an additional step.

SUMMARY OF THE DISCLOSURE

It is the object of the present invention to provide a glass having excellent resistance against surface damages.

The invention relates to a glass having improved resistance against surface damages, the glass having a content of alkaline earth oxides of at least 0.3% by weight and a content of $P_2O_5$ in the range of from 0.1 to 4% by weight. On at least one surface, preferably on the floating lower side, the glass has precipitations with a mean size of from 1 to 20 μm.

BRIEF DESCRIPTION OF THE DRAWING

The FIGURE provided illustrates an exemplary Quarzal die which can be used as a weight for encumbering the samples to test the resistance of the surface. Reference sign 1 denotes the contact area with which the die is pressed onto the surface.

DETAILED DESCRIPTION OF THE DISCLOSURE

"Mean size" means the mean diameter of the precipitations. Preferably, this mean size is the Feret's diameter of the precipitations. Preferably, the precipitations are of nearly circular shape.

The glass can be obtained through a method which comprises the following steps: melting of a glass batch and casting the obtained glass melt onto a float bath.

The method described herein according to which the glass in accordance with the present invention can be produced is also subject matter of the invention and is described in more detail below.

Preferably, the precipitations on the glass according to the present invention are softer than the glass itself so that they can protect the respective surface of the glass in case of mechanical stress.

The surface on which the precipitations are present is either the upper side or the lower side of the glass wherein the lower side of the glass is that side from all sides of the glass with the largest contact area to the float bath (floating lower side).

Preferably, the precipitations are alkaline earth phosphate precipitations. For that purpose glass mixtures with a content of alkaline earth oxides of at least 0.3% by weight are used in the production method of the glass. In preferable embodiments the glasses even comprise at least 1% by weight of alkaline earth oxides, further preferable at least 3% by weight and more preferable at least 5% by weight. These minimum quantities are necessary so that sufficient precipitations are formed on the respective glass surface. Particular maximum quantities should preferably not be exceeded so that the sizes of the precipitations and their mean distances are within the ranges according to the present invention. This maximum quantity is 15% by weight, preferably 10% by weight and more preferably 7% by weight of alkaline earth oxides.

To generate suitable alkaline earth phosphate precipitations on the glass surface, according to the present invention a content of $P_2O_5$ in the glass of from 0.1 to 4% by weight is required. Higher amounts of $P_2O_5$ are disadvantageous, because the chemical resistance of the glasses would be deteriorated and $P_2O_5$ would evaporate from the float bath and this may result in glass defects. Therefore the upper limit of the content of $P_2O_5$ in preferable embodiments according to the present invention is lower than 3% by weight, further preferable lower than 2% by weight.

There is an interaction between the contents of alkaline earths and $P_2O_5$ in the formation of the precipitations. Therefore, for the intended size and surface coverage of the precipitations on the respective surface of the glass it is preferable that in the case of higher contents of alkaline earths the content of $P_2O_5$ is lower than in the case of lower contents of alkaline earths. Because of this reason, preferable glasses have contents of alkaline earths of up to 15% by weight, whereas the content of $P_2O_5$ in these glasses is lower than 1% by weight. In preferable embodiments the content of alkaline earth oxides is higher than 5% by weight and the content of $P_2O_5$ is lower than 2% by weight.

Unless otherwise stated, according to the present invention alkaline earth oxides are magnesium oxide, calcium oxide, strontium oxide and barium oxide. In preferable embodiments the glass only comprises calcium oxide and/or magnesium oxide as alkaline earth oxides. The phosphates of these two alkaline earth cations are characterized by a high formation rate in the floating process. Therefore, with respective preferable compositions the production of thin glasses with high feed rates in the floating process is possible, wherein at the same time also precipitations in sufficient size and number are formed. Also, the magnesium and calcium phosphate precipitations can easily be removed from the glass surface by washing.

The precipitations have good adherence on the glass surface without any permanent bonding. If it is required for particular uses to provide a glass surface without precipitations they can be removed with a soft polish or in a washing step during the production process. Since the precipitations are characterized by a relatively low chemical stability it is also possible to remove them through a washing process with diluted acids, such as for example diluted HCl solution, or bases. In some further processing procedures, such as e.g. the chemical tempering in salt baths, the precipitations are dissolved anyway.

According to the present invention, the mean size of the precipitations is 1 to 20 μm. These sizes are preferable, because on the one hand they are sufficiently high to provide the required protection for the glass surface, but on the other hand they are so low that they do not substantially affect the appearance of the glass surface. Particularly preferable embodiments according to the present invention are glasses with precipitations having mean sizes of between 2 μm and 15 μm.

A surface coverage of the respective glass surface with the precipitations of at most 25% is desirable according to the present invention. A surface coverage of higher than 25% is disadvantageous according to the present invention, because in such a case the physicochemical properties of the glass surface would be affected.

On the glass according to the present invention, the mean distance of the precipitations to each other is preferable 5 to 200 μm, because then the whole surface can be protected in an effective way.

The method of the production of the glass according to the present invention is preferably characterized by maintaining the glass melt for a time period of at least 5 minutes at a temperature of above 1000° C. on the float bath. This approach guarantees that sufficient precipitations are formed on the glass surface. In preferable embodiments the glass melt is even maintained at the mentioned temperature for at least 10 minutes.

Preferably, the floating process in the method according to the present invention is conducted on a tin bath, wherein this means that the bath has a content of tin of at least 80% by weight, preferably of at least 90% by weight and most preferably of at least 95% by weight. In particularly preferable embodiments the bath substantially consists of liquid tin.

Preferably, the starting temperature of the glass is higher than 1100° C., preferably higher than 1200° C., because such a high temperature promotes the formation of precipitations. The starting temperature is the temperature at which the liquid glass flows over the spout lip onto the liquid float bath under the spout lip.

In the method according to the present invention, after the step of melting, a glass batch of the glass melt is preferably directed over a spout lip onto the float bath.

The glass according to the present invention preferably has a content of up to 15% by weight, further preferably of up to 5% by weight of alkali oxides. A limited amount of alkali oxides in the glass is particularly preferable, since too large amounts affect the formation of the desired precipitations. But also in the presence of low amounts of alkali oxides in the glass precipitations may be formed which also comprise alkali phosphates. In addition, too high contents of alkalis deteriorate the chemical resistances of the glasses. Preferable embodiments of the glasses according to the present invention are free of alkali oxides.

Preferably, the method according to the present invention does not comprise the common step of treating the glass with sulfur dioxide and/or sulphur trioxide after the floating process.

Particularly advantageously the invention will be used in the case of floating glasses having higher viscosities and higher processing temperatures $V_A$ and transformation temperatures $T_g$ than soda-lime glass. The higher processing temperatures mean that the glass is cast over the spout lip onto the float bath at high temperatures. This is advantageous for a sufficient formation rate of the precipitations. Preferably, the processing temperature $V_A$ of the glasses in the method according to the present invention should be higher than 1100° C., further preferably higher than 1200° C.

For the contact temperature of the floating glass with the lift-out rollers the transformation temperature $T_g$ is a benchmark. At lower $T_g$ values the mechanical stress through the lift-out rollers is lower. With $SO_2$ and/or $SO_3$ gassing also other protection mechanisms are available for glasses with low viscosity. Therefore, a higher transformation temperature $T_g$ than 500° C., preferably higher than 600° C. is advantageous for the protection according to the present invention.

The method according to the present invention further preferably comprises the step of homogenizing and further preferably of refining a glass batch after melting. In the method according to the present invention above the float bath preferably a forming gas containing atmosphere which suppresses oxidation processes is present.

Preferably, the glass according to the present invention is free of toxic and radioactive components. In particular, the glass is preferably free of lead and arsenic.

Preferably, the glass according to the present invention is a flat glass. The casting of the glass melt onto the float bath is preferably followed by cooling down the glass melt in the floating section and subsequently by the lift-off operation of the solidified glass ribbon at the end of the floating section and preferably by a transfer into the annealing leer during which it rests on lift-out rollers. During this procedure the stress in the glass is relieved and it is transferred into environment atmosphere. Prior art suggests at this point of the procedure gassing with $SO_2$ and/or $SO_3$ containing vapors as a measure for the protection of the glass. According to the present invention, this step can be omitted. Thereafter, preferable common steps of post processing such as cutting and separating the glass ribbon into flat glass panes in the desired formats are conducted. Preferably, after the production the glass will be stacked without the need for an additional protection measure between the single glass panes. The precipitations facilitate a direct storage of the glass panes on top of each other.

While this invention can basically be used for many kinds of glasses and a broad spectrum of compositions, it was shown that particularly advantageous glasses according to the present invention are obtained when the following components within the given ranges are contained. The satisfaction of each of these conditions facilitates the success.

Preferably, the glass comprises $SiO_2$ in an amount of at least 50% by weight, preferably at least 60% by weight and most preferably at least 65% by weight. This component serves as a glass forming agent which increases the stability and resistance of the glass according to the present invention. But the content of $SiO_2$ should not exceed the value of preferably 75% by weight and further preferably 70% by weight, because otherwise the processing temperature would increase so that an economic production at moderate temperatures would not be feasible any longer.

Preferably, the glass comprises $Al_2O_3$ in an amount of at least 10% by weight, preferably at least 12.5% by weight and most preferably at least 15% by weight. This component serves as a glass forming agent which increases the stability and resistance of the glass according to the present invention. But the content of $Al_2O_3$ should not exceed the value of preferably 30% by weight and further preferably 24% by weight, because otherwise the tendency to crystallization of the glass would increase.

The object of the present invention is to provide a particularly resistant glass; wherein for this reason both glass forming agents $Al_2O_3$ and $SiO_2$ in sum are preferably contained in the glass in an amount of at least 85% by weight. So, the glass according to the present invention is preferably an aluminosilicate glass.

To lower the melting temperature, the glasses may preferably contain up to 8% by weight, more preferably up to 4% by weight and most preferred up to 2.5% by weight of $B_2O_3$. The addition of $B_2O_3$ improves the stability of the glass against devitrification and decreases the melting temperatures which results in advantageous aspects for an economic production. But on the other hand too high contents result in increased evaporation of boron out of the glass melt which is not desired due to corrosion in the melting aggregate and in the floating bath. In preferred embodiments, the $B_2O_3$ content in the glass is at least 1% by weight in other embodiments, the glasses are essentially free from $B_2O_3$.

In preferable embodiments the glass may contain nucleating agents such as $TiO_2$ and/or $ZrO_2$ in amounts of 2 to 6% by weight. This is necessary, if the glass is used as a base glass for the crystallization into a glass ceramic.

Preferably, refining agents are used in the glass. However, the common refining agents $As_2O_3$ and $Sb_2O_3$ are not suitable, because they are reduced in the float bath at the surface and thus result in discoloration of the glass. Therefore, other refining agents in amounts of 0.1 to 0.6% by weight are preferable. A preferable refining agent is $SnO_2$ which further preferably can be used in combination with halide compounds such as chlorides and/or fluorides. Moreover, the halide compounds alone can be used as refining agents. Additional possible refining agents are sulfate compounds.

In preferable embodiments the glasses further contain $CeO_2$ in amounts of up to 1.5% by weight. This additive is used for the adjustment of the absorption of the glasses in the UV range. In this way a protection effect is achieved which may result in an extension of the lifetime of the glasses. $CeO_2$ may also be used as a refining agent.

Particular embodiments of the glasses according to the present invention contain colored oxides to color the glasses or to over-color a tint of the glass. These glasses contain colored oxides in amounts of up to 0.4% by weight. A preferable colored oxide is $Nd_2O_3$. But preferably, the glasses according to the present invention are free of coloring additives.

According to the present invention also alkaline earth phosphates are used to increase the surface resistance of glasses, in particular such glass according to the present invention. In this case the alkaline earth phosphates are preferably used such that they are added to a glass mixture so that a glass according to the present invention is obtained. The glass mixture is processed in accordance with the method according to the present invention.

EXAMPLES

Table 1 shows the compositions and properties of the glasses which have been prepared as experiments. The total sum of the amounts of the composition is not exactly 100% by weight, since impurities, such as e.g. ca. 0.013% by weight of $Fe_2O_3$, alkalies such as Rb and Cs, alkaline earths, F, Cl and others are contained in very low amounts. The content of water of the glass melt in the embodiment examples was 0.02 to 0.4 mol/l.

The glasses have been melted of raw materials which are common in glass industry at temperatures of ca. 1650° C. and cast onto a floating bath in a large-scale industrial facility. The temperatures at which the glasses have been cast onto the liquid tin and the residence time of the glass melt at temperatures of above 1000° C. can be found in table 2.

In the shaping zone the glasses have been drawn to a glass ribbon having a width of ca. 250 cm and a thickness of 4 mm.

In conducting the experiments for testing the resistance of the glass surface against mechanical stress polished Quarzal cubes of sintered silica glass powder having an edge length of 1 cm have been put onto the glass surface to be tested and encumbered with additional weights of 150 g. The thus prepared samples were heated from room temperature to 670° C. with a rate of 5° C./min, then heated to 720° C. with a rate of 3° C./min, then the temperature was maintained at this value for 10 min and then it was rapidly cooled down according to the characteristics line of the oven. The test method simulates the contact with the lift-off rollers in the annealing leer at high temperatures and allows the evaluation of the floating surfaces with and without precipitations of alkaline earth phosphates (lower vs. upper side) relatively to each other. Before and after the test the samples were assayed in respect to defects with the help of an optical light microscope.

Before the test of the samples the glass surfaces were rinsed with distilled water to remove non-adherent impurities. Since the floating upper sides of the glasses do not carry precipitations by assaying the floating upper side and the floating lower side the effect of the resistance against mechanical stress can be evaluated relatively to each other on the same sample. The floating upper sides of the glasses are used as comparison examples.

TABLE 1

Compositions in % by weight on the basis of oxides, properties and floating parameters of the glasses

| Composition | (% by weight) | Glass No. 1 | Glass No. 2 |
|---|---|---|---|
| $Al_2O_3$ | | 22.3 | 18.7 |
| $B_2O_3$ | | | 1.43 |
| BaO | | 0.05 | |
| CaO | | | 2.82 |
| $K_2O$ | | 0.20 | 0.59 |
| $Li_2O$ | | 4.1 | 4.0 |
| MgO | | 1.0 | 0.51 |
| $Na_2O$ | | 0.6 | 1.04 |
| $Nd_2O_3$ | | 0.25 | |
| $P_2O_5$ | | 1.3 | 1.11 |
| $SiO_2$ | | 65.8 | 66.3 |
| $SnO_2$ | | 0.4 | 0.44 |
| SrO | | | 1.3 |
| $TiO_2$ | | 1.5 | |
| ZnO | | 0.4 | 0.45 |
| $ZrO_2$ | | 2.0 | 0.68 |
| $CeO_2$ | | | 0.52 |
| | | 99.9 | 99.89 |
| Floating parameters | | | |
| $V_A$ | (° C.) | 1320 | 1250 |
| $T_g$ | (° C.) | 691 | 613 |
| Starting temperature | (° C.) | 1350 | 1270 |
| Residence time >1000° C. | min | 20 | 15 |
| Coefficients of thermal expansion (20-300° C.) | $10^{-6}$/K | 4.2 | 5.2 |
| Density | (g/cm$^3$) | 2.43 | 2.44 |

TABLE 2

Results of the measurement of the resistance of the surface

| | Glass No. 1 Floating lower side | Glass No. 1 Floating upper side | Glass No. 2 Floating lower side | Glass No. 2 Floating upper side |
|---|---|---|---|---|
| Precipitations of alkaline earth phosphates | | | | |
| Main constituent | Mg phosphate | none | Ca phosphate | none |
| Mean size (μm) | 11.8 | | 5.5 | |
| Surface coverage (%) | 6.2 ± 2.6% | | 6.2 ± 0.7% | |
| Amount of precipitations in 100 μm × 100 μm | 3.7 ± 1.0 | | 19.4 ± 2.3 | |
| Measurement of the resistance of the surface | | | | |
| Load | 100 g/cm$^2$ | 100 g/cm$^2$ | 100 g/cm$^2$ | 100 g/cm$^2$ |
| Defects > 100 μm | n.m. | n.m. | none | 210 |

What is claimed is:

1. A glass having improved resistance against surface damages, comprising:
   a content of alkaline earth oxides of at least 0.3% by weight of the total glass composition;
   a content of $P_2O_5$ of 0.1 to 4% by weight of the total glass composition; and
   precipitations with a mean size of 1 μm to 20 μm on only one surface of the glass.

2. The glass according to claim 1, wherein the precipitations cover at most 25% of the only one surface.

3. The glass according to claim 1, wherein the mean size is between 2 μm and 15 μm.

4. The glass according to claim 1, wherein the precipitations have a mean distance of between 5 μm and 200 μm.

5. The glass according to claim 1, wherein the precipitations comprise alkaline earth phosphates.

6. The glass according to claim 1, further comprising a content of alkali oxides of up to 5% by weight of the total glass composition.

* * * * *